US011035616B2

(12) United States Patent
Rhoden et al.

(10) Patent No.: US 11,035,616 B2
(45) Date of Patent: Jun. 15, 2021

(54) FUEL HEAT EXCHANGER WITH A BARRIER

(71) Applicant: Hamilton Sundstrand Corporation, Charlotte, NC (US)

(72) Inventors: William E. Rhoden, Glastonbury, CT (US); John W. Kowalski, Hadley, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 55 days.

(21) Appl. No.: 16/370,142

(22) Filed: Mar. 29, 2019

(65) Prior Publication Data

US 2020/0309462 A1 Oct. 1, 2020

(51) Int. Cl.
F28D 7/00 (2006.01)
F28F 1/04 (2006.01)
F28F 9/013 (2006.01)
F28D 21/00 (2006.01)

(52) U.S. Cl.
CPC ............ *F28D 7/0008* (2013.01); *F28F 1/045* (2013.01); *F28F 9/0131* (2013.01); *F28D 2021/0026* (2013.01)

(58) Field of Classification Search
CPC .... F28D 7/0008; F28D 17/005; F28D 1/0535; F28F 1/045; F28F 9/0131; F16L 9/18; F16L 9/19; F16L 9/20; B33Y 80/00
See application file for complete search history.

(56) References Cited

U.S. PATENT DOCUMENTS

| | | | | |
|---|---|---|---|---|
| 1,920,800 A | * | 8/1933 | Woods | F28F 1/20 165/160 |
| 2,707,095 A | * | 4/1955 | Parsons | F24T 10/10 165/135 |
| 3,346,461 A | * | 10/1967 | Notari | G21C 3/32 376/424 |
| 3,777,502 A | * | 12/1973 | Michie, III | F17D 1/00 62/50.7 |
| 3,976,129 A | * | 8/1976 | Silver | F22B 25/00 165/154 |
| 3,999,602 A | | 12/1976 | Fewell et al. | |

(Continued)

FOREIGN PATENT DOCUMENTS

EP 3187717 A1 7/2017
WO WO9703281 A1 1/1997

(Continued)

OTHER PUBLICATIONS

Extended European Search Report for EP Application No. 19211113.6, dated Jul. 1, 2020, pp. 8.

*Primary Examiner* — Tho V Duong
(74) *Attorney, Agent, or Firm* — Kinney & Lange, P.A.

(57) ABSTRACT

A heat exchanger includes a first channel with at least one first wall for porting a first fluid and a second channel with at least one second wall for porting a second fluid. The heat exchanger includes a barrier chamber located between the at least one first wall and the at least one second wall such that a rupture of one of the at least one first wall and the at least one second wall does not result in mixing of the first fluid and the second fluid. The heat exchanger includes a support member that extends between the at least one first wall and the at least one second wall.

7 Claims, 5 Drawing Sheets

(56) References Cited

U.S. PATENT DOCUMENTS

| | | | |
|---|---|---|---|
| 5,309,637 A * | 5/1994 | Moriarty | B23P 15/26 |
| | | | 228/183 |
| 8,051,902 B2 | 11/2011 | Kappes et al. | |
| 10,088,250 B2 | 10/2018 | Turney | |
| 2012/0180990 A1 * | 7/2012 | Przybylski | F28F 1/04 |
| | | | 165/104.14 |
| 2012/0251402 A1 * | 10/2012 | Goto | B01D 46/2474 |
| | | | 422/180 |
| 2016/0290738 A1 | 10/2016 | Kupiszewski et al. | |
| 2017/0191766 A1 * | 7/2017 | Karatas | F02C 7/222 |
| 2018/0238627 A1 * | 8/2018 | Herring | F28D 7/0008 |
| 2019/0033013 A1 * | 1/2019 | Byfield | B22F 3/1055 |
| 2019/0134894 A1 * | 5/2019 | Vadder | B29C 64/165 |
| 2019/0211949 A1 * | 7/2019 | Custer | F02C 6/08 |

FOREIGN PATENT DOCUMENTS

| | | |
|---|---|---|
| WO | WO2011115883 A2 | 9/2011 |
| WO | WO2014122890 A1 | 8/2014 |

* cited by examiner

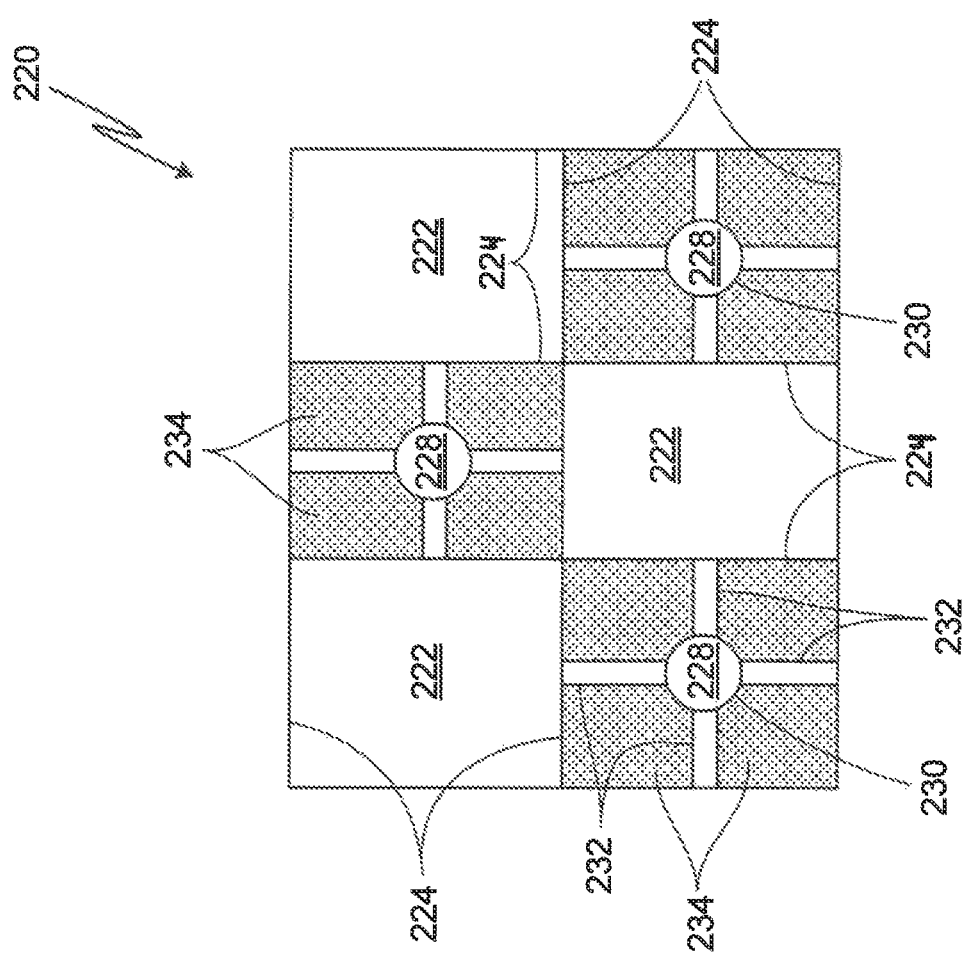

FUEL HEAT EXCHANGER WITH A BARRIER

BACKGROUND

The present disclosure relates generally to thermal management. More specifically, this disclosure relates to fuel/air heat exchangers in an aircraft having a gas turbine engine.

In a gas turbine engine, air is pressurized in a compressor and mixed with fuel in a combustor for generating hot combustion gases which flow downstream through turbine stages. A typical gas turbine engine generally possesses a forward end and an aft end with its several core or propulsion components positioned axially there between. An air inlet or intake is located at a forward end of the gas turbine engine. Moving toward the aft end, in order, the intake is followed by a compressor, a combustion chamber, and a turbine. It will be readily apparent from those skilled in the art that additional components may also be included in the engine, such as, for example, low-pressure and high-pressure turbines. This, however, is not an exhaustive list. In a typical turbo-prop gas turbine engine aircraft, turbine stages extract energy from the combustion gases to turn a turbo-propeller. In some embodiments, the propulsor may power one or more turbo-propellers in the case of some airplanes. In alternate embodiments, the propulsor may drive one or more turbo-propellers, embodied as rotors, for operation of a helicopter.

During operation, significant heat is generated by the high-pressure compressor, which generates high temperature flow. It may be necessary to manage heat generation within the engine so as not to raise engine temperatures to unacceptable levels. One method of doing this is by using bleed air to cool components. However, it may also be necessary to control the temperature of the compressor discharge air prior to such bleed air cooling other engine components.

In order to cool high pressure and temperature compressor discharge air, attempts have been made to utilize fuel as a heat sink. However, because heat exchangers typically operate above the auto-ignition temperature of the fuel, it has been difficult for aircraft engine manufactures to meet the stringent safety requirements implemented by regulatory agencies.

SUMMARY

A heat exchanger includes a first channel with at least one first wall for porting a first fluid and a second channel with at least one second wall for porting a second fluid. The heat exchanger includes a barrier chamber located between the at least one first wall and the at least one second wall such that a rupture of one of the at least one first wall and the at least one second wall does not result in mixing of the first fluid and the second fluid. The heat exchanger includes a support member that extends between the at least one first wall and the at least one second wall.

BRIEF DESCRIPTION OF THE DRAWINGS

FIG. 3B is a cross-sectional view of the third embodiment of the heat exchanger.

DETAILED DESCRIPTION

As aircraft engine efficiency has been improved over the years, there has been a general trend toward generating hotter temperatures in the engine core. Even when materials are used with higher heat tolerances, the parts within the engine core may still experience thermal fatigue over time. There is a need to effectively manage these temperatures in order to maximize the useful life of engine core parts.

A heat exchange device is disclosed herein, which effectively transfers thermal heat from a hot air source to the fuel within an aircraft engine while also meeting the stringent safety requirements of regulatory agencies. Hot air mixed with fuel will auto-ignite at elevated temperatures, so it is critical to keep the air and fuel from mixing during operation of the heat exchanger. A barrier chamber is provided within the disclosed heat exchanger, which prevents mixing of the air and the fuel even in the event of a rupture of one of the flow channels of either the hot air or the fuel. This redundancy of the barrier chamber in addition to the walls of each flow channel provides an increased operating safety margin for the heat exchanger.

Figure 1:
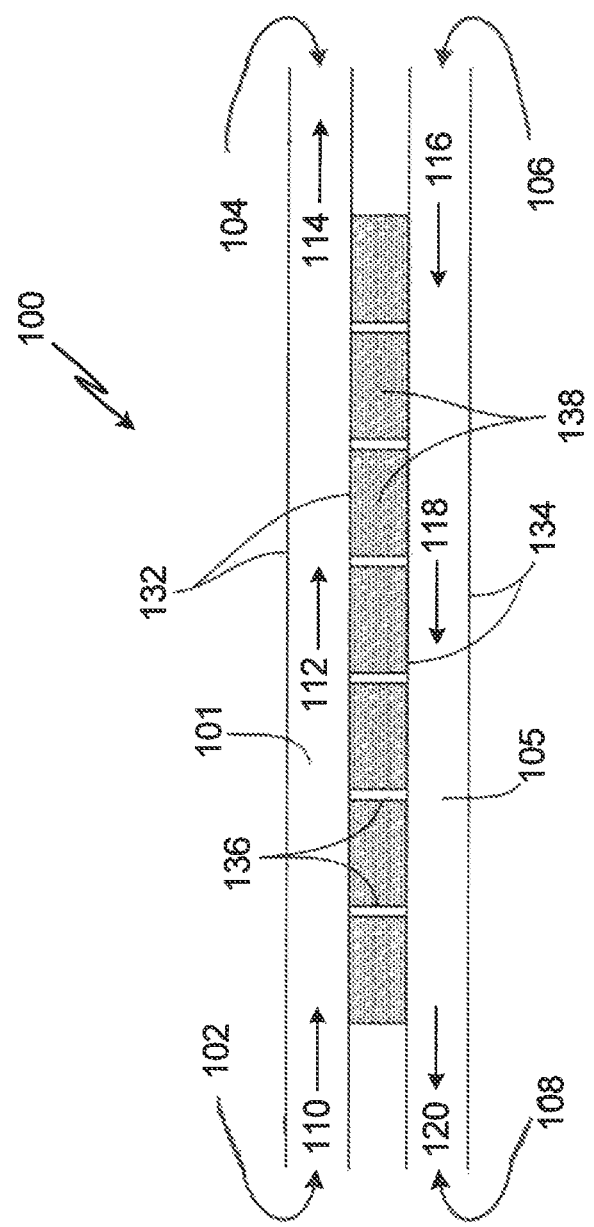
FIG. 1 is a cross-sectional view of a first embodiment of a heat exchanger.

FIG. 1 is a cross-sectional view of heat exchanger 100. FIG. 1 shows heat exchanger 100 with first channel 101, first channel inlet 102, first channel outlet 104, second channel 105, second channel inlet 106, second channel outlet 108, hot air 110, air exchange pathway 112, conditioned air 114, cold fuel 116, heat exchange pathway 118, conditioned fuel 120, first walls 132, second walls 134, support members 136, and barrier chambers 138.

First channel 101 of heat exchanger 100 has first channel inlet 102 and first channel outlet 104. Second channel 105 of heat exchanger 100 has second channel inlet 106 and first channel outlet 108. First channel 101 is defined by first walls 132. Second channel 105 is defined by second walls 134. Support members 136 extend between one first wall 132 of first channel 101 and one second wall 134 of second channel 105. Barrier chambers 138 can surround second channel 105 and separate first channel 101 from second channel 105.

A stream of hot air 110 enters first channel inlet 102 of heat exchanger 100. Hot air 110 travels through first channel 101 defined by first walls 132 and begins to undergo thermal exchange as hot air 110 travels along air exchange pathway 112. Conditioned air 114 then exits first channel outlet 104 of heat exchanger 100. Conditioned air 114 is at a lower temperature compared to hot air 110.

Concurrently, cold fuel 116 enters second channel inlet 106 of heat exchanger 100. Cold fuel 116 travels through second channel 105 defined by second walls 134 and begins to absorb heat from the hot air as the cold fuel 116 travels along heat exchange pathway 118. Conditioned fuel 120 then exits second channel outlet 108 of heat exchanger 100. Conditioned fuel 120 is at a higher temperature compared to cold fuel 116.

Support members 136 extend between one of second walls 134 of second channel 105 and one of first walls 132 of first channel 101. Support members 136 facilitate thermal exchange between hot air 110 and cold fuel 116. Barrier chambers 136 are positioned between one of second walls 134 of second channel 105 and one of first walls 132 of first channel 101 and prevents the mixing of air with fuel in the event that one of first walls 132 or second walls 134 crack or rupture.

Heat exchanger 100 can be any shape. For example, heat exchanger 100 can have a kidney-bean shape, which may allow heat exchanger 100 to be closely oriented and conformal with an annular engine casing. Heat exchanger 100 having a kidney-bean shape may improve the pack arrangement of parts within an aircraft engine.

Conditioned air 114 can be used, for example, to cool an engine component such as the turbine blades, buffer air cooling, or can be provided to an environmental control system for use in the cabin or flight deck of an aircraft.

Hot air 110 can be, for example, bleed air from an engine, compressed air, or air from an auxiliary power unit. The temperature of hot air 110 can be from 300° F. (150° C.) to 1300° F. (700° C.). The temperature of hot air can be from 450° F. (230° C.) to 1250° F. (680° C.). The temperature of hot air can be from 750° F. (400° C.) to 1200° F. (650° C.). The temperature of hot air can be from 1100° F. (590° C.) to 1200° F. (650° C.). Although FIG. 1 shows the air channel and the fuel channel opposed to one another, in alternate embodiments, the channels could run parallel to one another, be arranged perpendicular to one another, or be arranged at some other angle.

For example, first channel inlet 102 and second channel inlet 106 can be arranged on the same side of heat exchanger 100 with hot air 110, air exchanger pathway 112, and conditioned air 114 all running parallel to cold fuel 116, heat exchange pathway 118, and conditioned fuel 120. Similarly, first channel outlet 104 and second channel outlet 108 can both be arranged on the other side of heat exchanger 100 opposed to the side of heat exchanger 100 with first channel inlet 102 and second channel inlet 106.

Figure 2A:
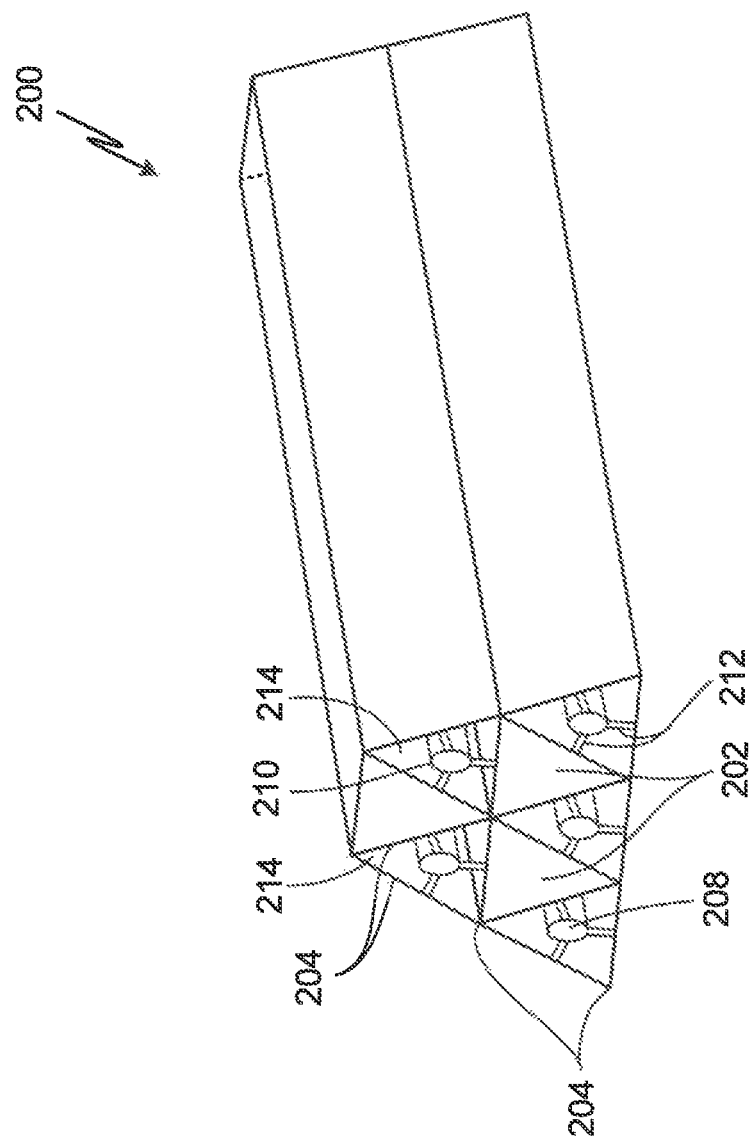
FIG. 2A is a schematic view of a second embodiment of a heat exchanger.
Figure 2B:
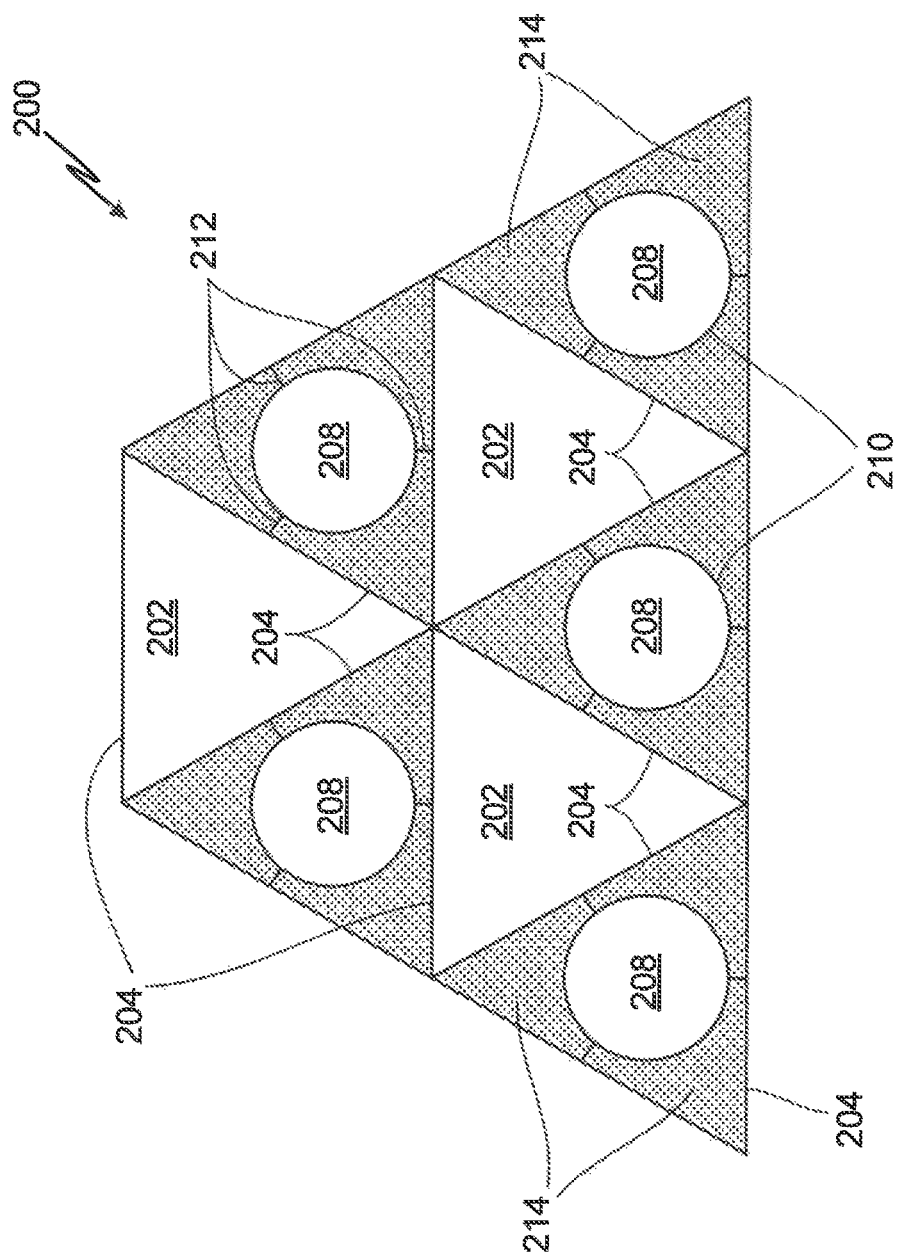
FIG. 2B is a cross-sectional view of the second embodiment of the heat exchanger.

FIGS. 2A and 2B will be discussed together. FIG. 2A is a schematic view of heat exchanger 200. FIG. 2B is a cross-sectional view of heat exchanger 200. Heat exchanger 200 includes plurality of first channels 202, walls 204, plurality of second channels 208, annular walls 210, support members 212, and barrier chambers 214.

A first flow path of heat exchanger 200 includes plurality of first channels 202 for the thermal exchange and transport of hot air. Each first channel 202 is defined by walls 204 and has an overall triangular shape. A second flow path includes plurality of second channels 208 for the thermal exchange and transport of cold fuel. Each second channel 208 is made up of annular wall 210 and is interspersed among plurality of first channels 202 in an alternating fashion. Plurality of second channels 208 are attached to plurality of first channels 202 by support members 212, which are attached to and extend between annular wall 210 of second channel 208 and one wall 204 of first channel 202. Surrounding each second channel 208 is barrier chamber 214, which is segmented by support members 212.

Referring to FIG. 2A, hot air travels through plurality of first channels 202 of heat exchanger 200. Heat is transferred to walls 204 of each of the plurality of first channels 202. Heat then travels through each support member 212 to annular walls 210. Heat is then transferred to the cold fuel in plurality of second channels 208 from annular walls 210. This results in thermal exchange between the hot air and cold fuel. Conditioned air then exits out of first channels 202 of heat exchanger 200. Cold fuel travels through plurality of second channels 208 of heat exchanger 200 absorbing heat along the way. Conditioned fuel then exits out of plurality of second channels 208 of heat exchanger 200.

Conditioned air from heat exchanger 200 can be used, for example, to cool an engine component such as the turbine blades, buffer air cooling, or can be provided to an environmental control system for use in the cabin or flight deck of an aircraft. Hot air for heat exchanger 200 can be, for example, bleed air from an engine, compressed air, or air from an auxiliary power unit. Conditioned fuel from heat exchanger 200 can be used, for example, for injection into the engine combustor. Using conditioned fuel, that is fuel at an elevated temperature, can result in greater combustion efficiencies, which results in a reduction in overall fuel usage.

The structural components of heat exchanger 200, including walls 204 of plurality of first channels 202, annular wall 210 of plurality of second channels 208, and support members 212 can be made up of any metal or alloy capable of withstanding the operational temperature range of heat exchanger 200. For example, aluminum can be used if the operational temperature range of heat exchanger 200 is below approximately 450° F. (230° C.). However, for the operational temperature range from 1100° F. (590° C.) to 1200° F. (650° C.), a nickel based alloy would typically be used, such as, for example, Inconel 625 or Haynes® 230®.

Support members 212 can be any width or length that is able to withstand numerous heating and cooling cycles, which take place during the useful life of a heat exchanger in an aircraft engine, and yet is able to also exchange a desired amount of thermal energy. For example, stress analysis software can be used to predict the fatigue support members 212 will experience under a specific set of conditions and can predict the specific geometries necessary for support members 212 to withstand the stresses within an aircraft engine while exchanging a sufficient amount of thermal energy between plurality of first channels 202 and plurality of second channels 208.

Barrier chambers 214 can be any material that prevents mixing of air with fuel in the event that one of walls 204 of plurality of first channels 202 or one of annular walls 210 of plurality of second channels 208 crack or rupture. Barrier chamber 214 can be, for example, graphite or graphene. Barrier chambers 214 can be formed of materials that are good heat conductors compared to support members 212. In other words, barrier chambers 214 can readily exchange thermal energy from one side of barrier chamber 214 to the other. Barrier chambers 214 can also be formed of materials that are poor heat conductors compared to support members 212. In other words, barrier chambers 214 do not readily exchange thermal energy from one side of the barrier chamber 214 to the other. A poor heat conductor means the barrier chamber material has a heat conduction value ten times smaller than that of the heat conduction value of the metal or alloy of support members 212. A good heat conductor means the barrier chamber material has a heat conduction value that is greater than a value that is ten times smaller than that of the heat conduction value of the metal or alloy of support member 212.

Heat exchanger 200 can be manufactured using brazed plate-fin, brazed tube bundle, or additive manufacturing techniques. Heat exchanger 200 has a plain triangular fin arrangement. Heat exchanger 200 can have other fin arrangements as well and the plurality of first and second channels made conformal with the shape choice. For example, if each plurality of first channels have a wavy fin or offset strip fin shape then each plurality of second channels would also have a wavy fin or offset strip fin shape.

Support members 212 provide additional separation between the air and fuel flow paths. Barrier chambers 214 surrounds plurality of second channels 208, which can be positioned centrally within barrier chambers 214. Barrier chambers 214 help to ensure that even in the event that one of the walls of either plurality of first channels 202 or plurality of second channels 208 ruptures, the air and fuel will not mix. This adds an additional safety feature to the heat exchanger. Support members 212 also provide a thermal path between plurality of first channels 202 and plurality of second channels 208. Although barrier chambers 214 may also provide a thermal path, this is not required. Barrier chambers 214 can be formed of an insulator material. Support members 212 also provide structural support throughout the heat exchanger.

Figure 3A:
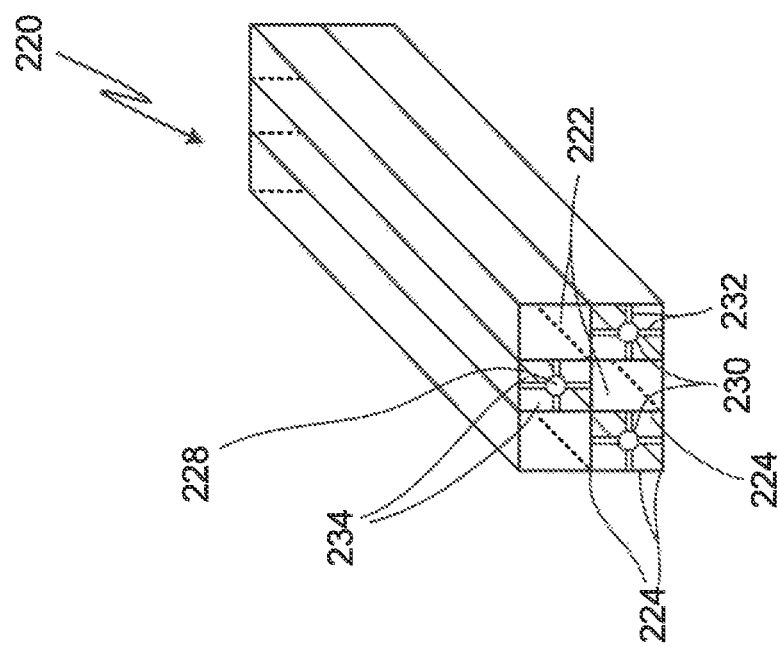
FIG. 3A is a schematic view of a third embodiment of a heat exchanger.

FIGS. 3A and 3B will be discussed together. FIG. 3A is a schematic view of heat exchanger 220. FIG. 3B is a cross-sectional view of heat exchanger 220. Heat exchanger 220 includes plurality of first channels 222, walls 224, plurality of second channels 228, annular walls 230, support members 232, and barrier chambers 234. Heat exchanger 220 has a plain rectangular fin arrangement. Heat exchanger 220 can have other fin arrangements as well and the plurality of first and second channels made conformal with the shape choice. For example, if each plurality of first channels have a wavy fin or offset strip fin shape then each plurality of second channels would also have a wavy fin or offset strip fin shape.

Heat exchanger 220 generally has the same design and structure as heat exchanger 200. Heat exchanger 220 is differentiated in that it has a plurality of first channels with a rectangular shape, whereas, heat exchanger 200 has a plurality of first channels with a triangular shape.

Discussion of Possible Embodiments

The following are non-exclusive descriptions of possible embodiments of the present invention.

A heat exchanger includes a first channel with at least one first wall for porting a first fluid and a second channel with at least one second wall for porting a second fluid. The heat exchanger includes a barrier chamber located between the at least one first wall and the at least one second wall such that a rupture of one of the at least one first wall and the at least one second wall does not result in mixing of the first fluid and the second fluid. The heat exchanger includes a support member that extends between the at least one first wall and the at least one second wall.

The heat exchanger of the preceding paragraph can optionally include, additionally and/or alternatively, any one or more of the following:

The first channel is configured to port air.

The first channel is configured to port aircraft engine bleed air, which has an inlet temperature from 300° F. (150° C.) to 1300° F. (700° C.), inclusive.

The second channel is configured to port fuel.

The barrier chamber is filled with graphite.

The barrier chamber is filled with a material that has a lower thermal conductivity compared to the support member.

The at least one first wall and the at least one second wall are formed of Inconel 625.

The support member is formed of Inconel 625.

The first channel has a triangular shape.

The first channel has a rectangular or square shape.

The second channel has an annular shape.

The support member is configured to transfer heat from the first channel to the second channel.

The at least one first wall, the at least one second wall, and the support member are an additively manufactured structure.

A heat exchanger includes a plurality of first channels defined by a plurality of walls for porting air and a plurality of second channels defined by an annular wall for porting fuel, where each second channel is interspersed among the plurality of first channels in an alternating fashion. The heat exchanger includes a barrier chamber, which surrounds the annular wall of the second channel, and is located between the plurality of walls of the first channel and the annular wall of the second channel and configured such that a rupture of one of the plurality of walls or annular wall does not allow mixing of air and fuel. The heat exchanger includes a plurality of support members, which extends between the annular wall of the second channel and one of the plurality of walls of the first channel and are configured to transfer heat from the plurality of first channels to the plurality of second channels.

The heat exchanger of the preceding paragraph can optionally include, additionally and/or alternatively, any one or more of the following:

The barrier chamber is filled with graphite.

The plurality of walls of the plurality of first channels and the annular walls of the plurality of second channels are formed of Inconel 625.

The support members are formed of Inconel 625.

The plurality of first channels each have a triangular shape.

The plurality of first channels each have a rectangular or square shape.

The plurality of walls, the annular walls, and the plurality of support members are an additively manufactured structure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger comprising:
a plurality of first channels for porting air, wherein each first channel is defined by a plurality of walls;
a plurality of second channels for porting fuel, wherein each second channel is defined by an annular wall, and wherein each second channel is interspersed among the plurality of first channels in an alternating fashion;
a barrier chamber surrounding the annular wall of the second channel and located between the plurality of walls of the first channel and the annular wall of the second channel, wherein the barrier chamber is configured such that a rupture of one of the plurality of walls and one of the annular walls does not result in mixing of the air and the fuel; and
a plurality of support members, each support member extending between the annular wall of one of the second channels and one of the plurality of walls of one of the plurality of first channels, wherein the support members are configured to transfer heat from the plurality of first channels to the plurality of second channels.

2. The heat exchanger of claim 1, wherein the barrier chamber is formed of graphite.

3. The heat exchanger of claim 1, wherein the plurality of walls of the plurality of first channels and the annular walls of the plurality of second channels are formed of Inconel 625.

4. The heat exchanger of claim 1, wherein the support members are formed of Inconel 625.

5. The heat exchanger of claim 1, wherein the plurality of first channels each have a triangular shape.

6. The heat exchanger of claim 1, wherein the plurality of first channels each have a rectangular or square shape.

7. The heat exchanger of claim 1, wherein the plurality of walls, the annular walls, and the plurality of support members are an additively manufactured structure.

* * * * *